United States Patent [19]

Kusaba

[11] Patent Number: 4,974,077
[45] Date of Patent: Nov. 27, 1990

[54] APPARATUS FOR DETECTING EDGE POSITION OF ELONGATED ARTICLE

[75] Inventor: Takeshi Kusaba, Higashimurayama, Japan

[73] Assignee: Bridgestone Corporation, Tokyo, Japan

[21] Appl. No.: 387,041

[22] Filed: Jul. 31, 1989

[30] Foreign Application Priority Data

Aug. 5, 1988 [JP] Japan ................................. 63-194568

[51] Int. Cl.⁵ .............................................. H04N 7/00
[52] U.S. Cl. ..................................... 358/101; 358/107; 382/8
[58] Field of Search ........................ 358/101, 107, 98; 382/18, 8, 22

[56] References Cited

U.S. PATENT DOCUMENTS 4,441,125  4/1984  Parkison ........................... 358/213.11

FOREIGN PATENT DOCUMENTS

| 54-25757 | 2/1979 | Japan . | |
|---|---|---|---|
| 0047573 | 4/1980 | Japan ...................................... | 382/18 |
| 55-116208 | 9/1980 | Japan . | |
| 57-29438 | 2/1982 | Japan . | |
| 58-191908 | 9/1983 | Japan . | |
| 58-173409 | 10/1983 | Japan . | |
| 59-75106 | 4/1984 | Japan . | |
| 60-207980 | 10/1985 | Japan . | |
| 60-210644 | 10/1985 | Japan . | |
| 0228906 | 11/1985 | Japan ...................................... | 382/22 |
| 61-14507 | 1/1986 | Japan . | |
| 62-249005 | 10/1987 | Japan . | |
| 63-108207 | 5/1988 | Japan . | |

Primary Examiner—Howard W. Britton
Assistant Examiner—Michael Lee
Attorney, Agent, or Firm—Sughrue, Mion, Zinn, Macpeak & Seas

[57] ABSTRACT

An apparatus for detecting an edge position of an elongated article in which an image of the edge portion of the object is picked up by a two-dimensional television camera arranged above the article such that the scanning line of the television camera is made substantially parallel with the edge portion of the article, an image signal of the image of the edge portion is converted into a bivalent signal representing black and white pixels, the number of the black pixels in every scanning line is counted to obtain an histogram, a scanning line number at which the number of the black pixels is abruptly increased in the histogram is detected as the edge position of the article.

10 Claims, 5 Drawing Sheets

FIG_1
PRIOR ART
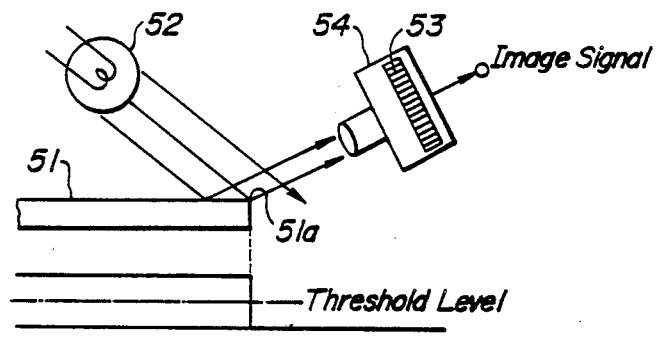
FIG_2
PRIOR ART
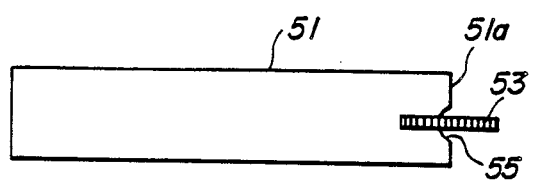

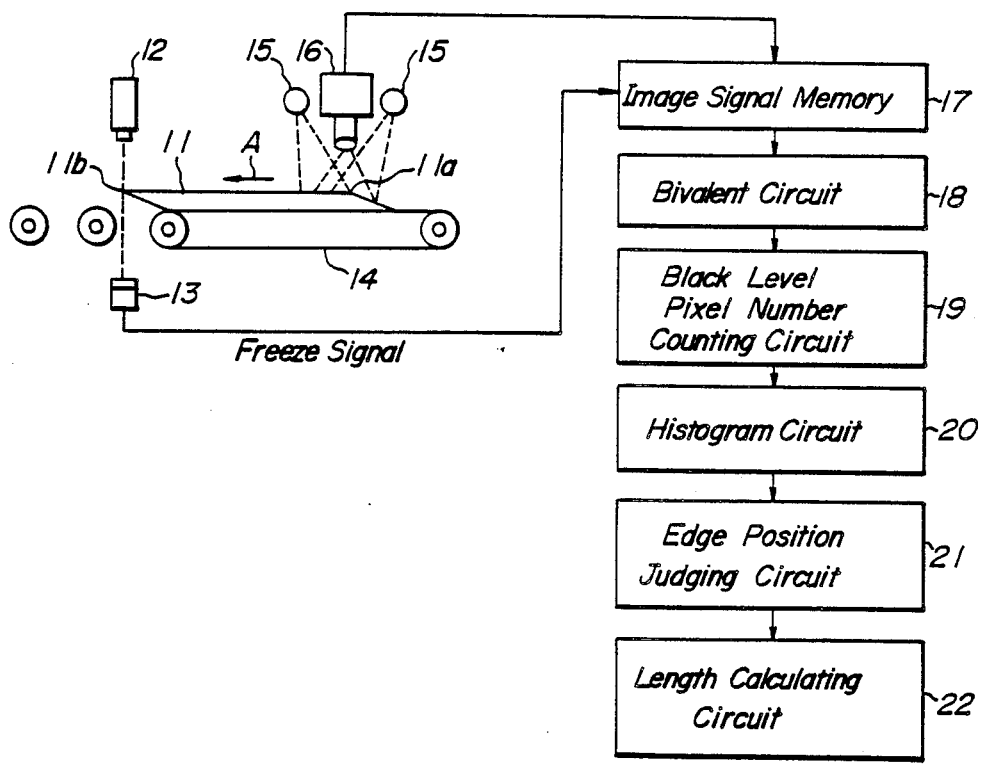
FIG_5

APPARATUS FOR DETECTING EDGE POSITION OF ELONGATED ARTICLE

BACKGROUND OF THE INVENTION

Field of the Invention and Related Art Statement

The present invention relates to an apparatus for detecting an edge position of an article. More particularly, it relates to an apparatus for detecting a substantially linear edge position of an elongated article without bringing the apparatus into contact with the article.

Hitherto, it has been widely practiced to detect the edge position of the elongated article without bringing the apparatus into contact with the article. FIG. 1 is a schematic view showing a conventional apparatus therefor. As clear from FIG. 1, an edge portion 51a of an article 51 is illuminated by a light source 52, and an image of the edge portion 51a is picked-up by a television camera 54 having a onedimensional linear array sensor 53. In the linear array sensor 53 there are provided a plurality of light receiving elements which are linearly arranged in a direction perpendicular to an extending direction of the edge portion 51a of the article 51. The edge position 51a can be obtained by comparing an output signal level of the linear array sensor 53 with an appropriate threshold level.

In the conventional apparatus, since, as shown in FIG. 2, the light receiving elements of the linear array sensor 53 are arranged substantially perpendicular to the extending direction of the edge portion 51a of the article 51, a single point on the edge portion at which the linear image sensor 53 and the edge portion 51a intersect with each other is detected and the thus detected point is regarded as the edge position of the article. Thus, when the length of the article is measured on the basis of the thus obtained position of the edge portion, if a defect 55 is formed in the edge portion of the article and the image sensor 53 intersects with the edge portion at the defect as shown in FIG. 2, the length of the article could not be measured correctly. Thus, the conventional apparatus has a drawback that the detecting result is apt to be largely affected by a defect, dust or an obstacle formed in or adhered to the edge portion of the article to be measured.

A tread rubber for use in manufacturing tires is liable to have such a defect or dust in the edge portion thereof due to the transportation or handling after cutting the tread rubber. Further the edge portion of the tread rubber is usually cut obliquely in order to join tread rubbers to each other by putting over the obliquely cut edge portions successively. Therefore, when the article to be measured is the tread rubber, the measured length thereof might be varied depending upon the point at which the linear array sensor intersects with the edge portion of the tread rubber. In order to reduce the affect caused by the defect or dust formed in or adhered on the edge portion of the tread rubber, it would be suggested to detect the edge position at two or more points and to derive a mean value of the detected results. However, if there is a defect or dust at one of these points, it is not possible to measure the length of the tread rubber accurately and the reliability of the measurement becomes low because any error caused by the defect or the dust in the edge portion of the article will be still in the measurement results.

SUMMARY OF THE INVENTION

The present invention has for its object to provide a novel and useful apparatus for detecting an edge position of an article, by means of which the edge position can be accurately detected with high reliability even if a defect or dust is formed or adhered in the edge portion of the article to be measured.

The apparatus according to the present invention comprises:

a light source means for projecting an illumination light at least to the edge portion of the article;

a television camera means for picking up an image of the edge portion of the article to produce an image signal, said television camera means being arranged such that scanning lines of the television camera means are substantially parallel with a width direction of the edge of the article;

means for converting said image signal into a bivalent signal representing white and black pixels;

means for counting the number of the white or black pixels of the bivalent signal in every scanning line to make a histogram of the white or black pixels; and edge detecting means for receiving the histogram and detecting the edge position of the article in accordance with a change in the number of the white or black pixels in the histogram.

In the apparatus according to the invention, an image of the edge portion of the article is picked up by a two-dimensional television camera which is arranged above the article such that the scanning lines of the television camera are made substantially parallel with the extending direction of the edge portion. The number of white or black pixels on every scanning line of the thus obtained image signal is counted to make a histogram therefor. The scanning line from which the number of white or black pixels is largely changed is detected as the edge position of the article. Therefore, it is possible to detect the edge position accurately with high reliability but without being affected by the defect or dust existing in the edge portion of the article to be detected.

BRIEF DESCRIPTION OF THE DRAWINGS

FIG. 1 is a schematic view showing the conventional apparatus for detecting the edge position of the article;

FIG. 2 is a schematic view depicting the relative position of the linear image sensor of the conventional apparatus and the edge portion of the article;

FIG. 5 is a schematic view representing an embodiment of the apparatus according to the invention by means of which a length of a tread rubber for manufacturing a tire is measured;

DETAILED EXPLANATION OF THE PREFERRED EMBODIMENTS

Figure 3:
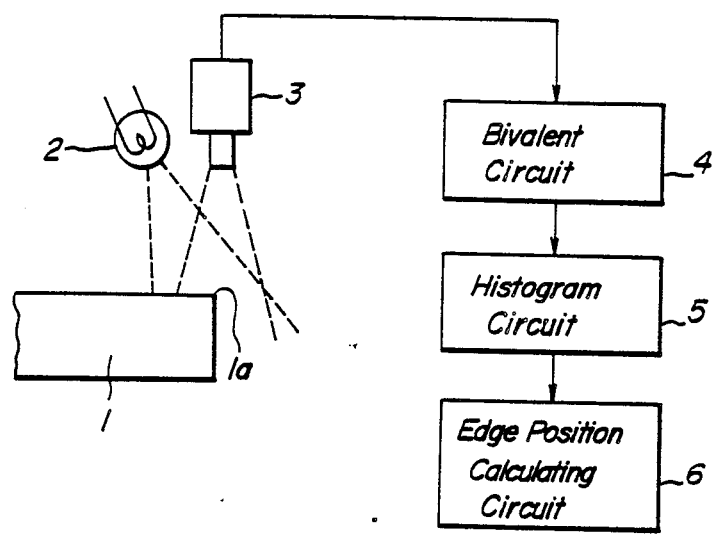
FIG. 3 is a schematic view illustrating the basic constitution of the apparatus for detecting the edge position of the article according to the invention.
Figure 4A:
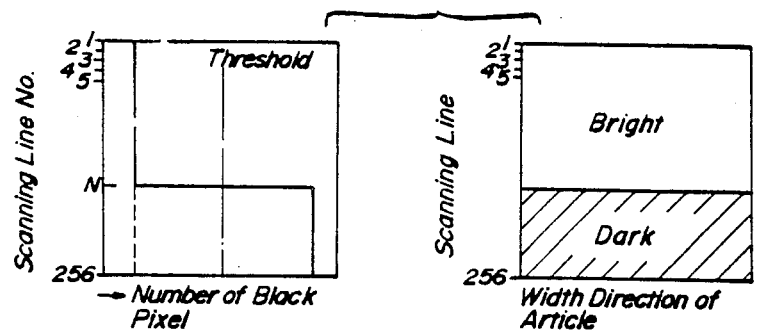
FIGS. 4A to 4C are schematic views for explaining the operation of the apparatus according to the invention.
Figure 4B:
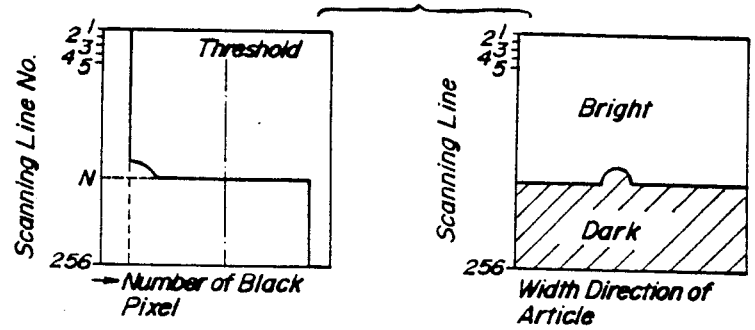
Figure 4C:
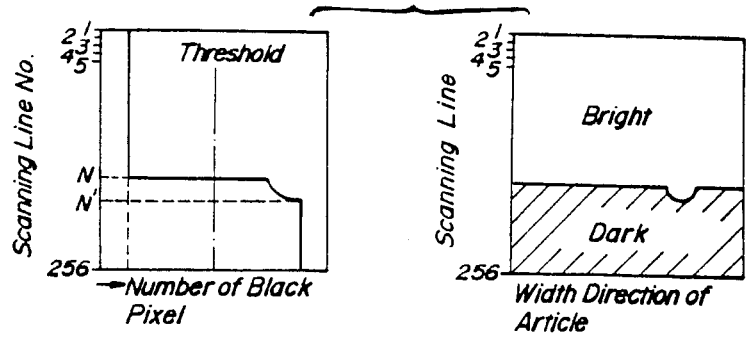

FIG. 3 is a block diagram showing the basic constitution of the apparatus for detecting the edge position of the article according to the present invention. Above an article 1 is arranged a light source 2 to uniformly illuminate the edge portion 1a of the article. A two-dimensional television camera 3 is also arranged above the article 1 to pick up the image of the edge portion 1a of the article 1 which is illuminated by the light source 2. In the present invention, the television camera 3 is of the raster scanning type and is arranged such that the scanning lines of the television camera 3 are made parallel with the extending direction of the edge portion 1a of the article 1. An image signal of the edge portion 1a picked up by the television camera 3 is supplied to a bivalent circuit 4 in which the image signal is converted into a bivalent image signal composed of white and black level signals by comparing the image signal with a predetermined reference level. In this case, the white level signal represents the article and the black level signal denotes the background. The bivalent signal is supplied to a histogram circuit 5 in which the number of white or black level pixels in every scanning line is counted and a histogram of the white or black level pixels is formed as illustrated in FIGS. 4A to 4C. In FIGS. 4A to 4C, images of the edge portions of three kinds of articles picked up by the television camera 3 are schematically illustrated in the right-side view, and the histograms thereof are shown in left-side graphs, respectively. In the graphs, the ordinates represent the scanning line number of the raster of the television camera 3, and the abscissa the number of the black level pixels. The condition of the edge portion of the article illustrated in FIG. 4A is almost perfect, i.e. no defect or dust is in the edge portion, and therefore the number of the black level pixels is abruptly increased up to the maximum just at the Nth scanning line. In FIG. 4B, the image of the article having a concave defect at the edge portion is picked up and in the histogram, there is acknowledged a slight increase in the number of the black level pixels in some scanning lines before the Nth line. But the increased number of pixels before the Nth line is not so large and at the Nth scanning line the number of black level pixels is suddenly increased. Contrary to this, the article illustrated in FIG. 4C has a convex defect at the edge portion. In the histogram therefor, the number of the black level pixels is suddenly increased at the Nth scanning line, but does not reach the maximum value. At a scanning line N' which situates after the Nth line by several scanning lines, the number of black level pixels becomes maximum. It is possible to detect the scanning line at which the number of the black level pixels firstly exceeds a predetermined threshold level, so that the edge position of the article can be detected accurately without being affected by the defect or dust.

The scanning line at which the number of black level pixels is abruptly increased is found in the above explained manner, and a signal denoting the relevant scanning line is supplied to an edge position calculating circuit 6. In the calculating circuit 6, a position of the relevant scanning line is calculated on the basis of the center of the field of view of the television camera 3. In this manner, the position of the edge portion 1a of the article 1 can be detected.

FIG. 5 shows an embodiment of the apparatus according to the present invention. In the present embodiment, the apparatus is used for measuring a length of a tread rubber for use in manufacturing tires. As shown in FIG. 5, the tread rubber 11 has a parallelogram shape viewed from the side. Generally, the length of the tread rubber is determined by measuring the longitudinal distance of the tread rubber between one edge portion 11a having an obtuse angle viewed from the side (first edge portion) and the other edge portion 11b having an acute angle (second edge portion).

Figure 6:
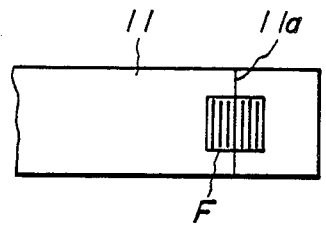
FIG. 6 is a plan view showing the relation between the edge portion of the tread rubber and the field of view of the television camera installed in the apparatus according to the present invention.

In the embodiment of FIG. 5, the first edge portion 11a is detected by the apparatus according to the present invention, and the second edge portion 11b is detected by a light projector 12 and a photo electric switch 13. The tread rubber 11 is conveyed in a direction shown by an arrow A by means of a belt conveyor 14. Above the traveling path of the tread rubber 11 are arranged a light source 15 and a two-dimensional television camera 16. It should be noted that an optical axis of the light projector 12 and photoelectric switch 13 is arranged to be separated from the television camera 16 by a standard length of tread rubber for tires. In order to illuminate the edge portion 11a uniformly, the light source 15 has a ring like shape and is arranged to surround the television camera 16. The two-dimensional television camera 16 comprises a solid state image sensing device by means of which the image of the first edge portion 11a of the tread rubber 11 is scanned two-dimensionally. In the television camera 16 solid state image pick-up elements are arranged in two hundred and fifty six (256) rows each having two hundreds and fifty six (256) elements. The two-dimensional television camera 16 has its field of view F of 20×20 mm and is arranged such that the center portion of the first edge portion 11a of the tread rubber 11 is included in the field of view as illustrated in FIG. 6. The scanning lines of the television camera 16 are arranged to be parallel with the extending direction of the edge portion 11a of the tread rubber 11. The output image signal of the two-dimensional television camera 16 is supplied to an image signal memory 17 and is stored therein. That is a signal which is produced at the timing when the second edge portion 11b of the tread rubber 11 is detected by the photoelectric switch 13 is supplied to the image memory 17 as a freeze timing signal, and the image signal read out of the television camera 16 at that timing is memorized in the memory 17 in a moment. It should be noted that, the belt conveyor 14 is driven continuously. The image signal of one frame is stored in the memory 17 in this manner, when the edge portion 11a of the tread rubber 11 comes within the field of view of the television camera 16.

Next, the image signal is read out of the memory 17 and is supplied to a bivalent circuit 18. In the bivalent circuit the analog image signal is compared with a threshold level and is converted into a bivalent signal representing the black and white level pixels. The bivalent signal is supplied to a black level pixel number counting circuit 19 in which the number of the black level pixels of the bivalent signal is counted at every scanning line. The signal representing the thus obtained number of the black level pixels at every scanning line is supplied to a histogram circuit 20 in which a histogram for the number of black level pixels at every scanning line is made. The thus obtained histogram signal is supplied to an edge position judging circuit 21. In the judging circuit 21, the black pixel number signal is compared with a threshold level such as 100 pixels and a scanning line at which the number of the black level pixels firstly exceeds the threshold level of 100 pixels is detected as the position of the edge portion. It is possible to determine the threshold value in accordance with the kind of the object to be measured, so that the best threshold value for the kind of the object can be obtained experimentally. The signal representing the scanning line at the edge portion 11a of the tread rubber 11 is then supplied to a length calculating circuit 22.

Figure 7:
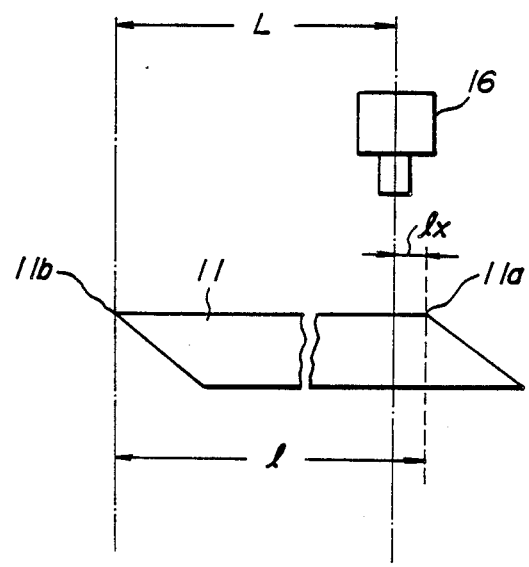
FIG. 7 is a schematic view explaining a calculating method for calculating the length of the tread rubber.

As shown in FIG. 7, the distance L between a position of the second edge portion 11b of the tread rubber detected by the light projector 12 and photoelectric switch 13 and the center of the television camera 16 has been previously determined and also the distance corresponding to one pitch of the scanning lines of the television camera 16 has been known. In the length calculating circuit 22, a distance $l_x$ between the position corresponding to the center of the television camera 16 and the position corresponding to the relevant line, i.e. the position of the first edge portion 11a, is calculated. This distance $l_x$ can be easily obtained by multiplying the number of the scanning lines existing between the center of the television camera 16 and the relevant scanning line by the distance corresponding to the scanning line pitch. Thereafter, the length l of the tread rubber 11 is calculated by an equation of $l=L+l_x$.

As explained in the above, according to the apparatus of the present invention, the position of the edge portion of the object can be detected accurately with a high reliability but without being affected by a defect or a dust formed in or adhered on the edge portion of the object.

What is claimed is:

1. An apparatus for detecting an edge position of an elongated tire construction member having front and rear edge portions comprising:
    a light source means for projecting an illumination light at least to an edge portion of the member to be detected;
    a two-dimensional television camera means for picking up an image of the edge portion of the member to produce an image signal, said television camera means being arranged such that scanning lines of the television camera means are substantially parallel with a width direction of the edge of the member;
    means for converting said image signal into a bivalent signal representing white and black pixels;
    means for counting the number of the white or black pixels of the bivalent signal in every scanning line to make a histogram of the white or black pixels;
    edge detecting means for receiving the histogram and detecting the rear edge position of the member in accordance with a change in the number of the white or black pixels in the histogram said edge detecting means comprising photoelectric timing detecting means for detecting the front edge portion of the member comes within a field of view of the television camera and producing a detection freeze signal; and
    means responsive to said detection freeze signal of the first edge portion of the member to freeze said image from the television camera means so that an image signal of rear edge of the elongated member is extracted to derive said histogram.

2. An apparatus according to claim 1, wherein said television camera means comprises a two-dimensional television camera.

3. An apparatus for detecting an edge position of an elongated member having a front and rear edge portions according to claim 1 further comprising:
    means for conveying the elongated member in a longitudinal direction of the member.

4. An apparatus according to claim 1, wherein:
    said photoelectric timing detecting means is arranged to be separated from the television camera means by a standard length of the member and comprises a light source and photoelectric switch arranged on respective sides of the member, said detection signal being generated when the second edge portion of the member is detected by said photoelectric switch.

5. An apparatus according to claim 4, wherein:
    said image signal freezing means comprises a memory for storing the image signal of the first edge portion of the article supplied from the television camera in response to the detection signal.

6. An apparatus according to claim 1, wherein:
    said counting means comprises a circuit for counting the number of black level pixels in every scanning line and a circuit for making a histogram in accordance with the number of the black pixels.

7. An apparatus according to claim 6, wherein;
    said edge position detecting means detects as the edge position a scanning line at which the number of the black level pixels firstly exceeds a predetermined threshold number.

8. An apparatus according to claim 7, wherein:
    said television camera has two hundreds and fifty six (256) scanning lines each having two hundreds and fifty six (256) pixels and said predetermined threshold number is set to about one hundred (100).

9. An apparatus according to claim 5, further comprising:
    means for calculating a length (l) of the member from a distance (L) between a center of the field of view of the television camera and the timing detecting means, and a distance ($l_x$) between the center of the field of view of the television camera and the scanning line at the rear edge position.

10. An apparatus according to claim 9, wherein:
    said elongated member is a tread rubber for use in manufacturing tires, and a length of the tread rubber is measured by detecting an edge position having an acute angle viewed from a side by means of the photoelectric switch of the timing detecting means and an edge position having an obtuse angle viewed from a side by means of the television camera.

* * * * *